United States Patent [19]

Harnden

[11] Patent Number: 5,365,812

[45] Date of Patent: Nov. 22, 1994

[54] AUTOMATIC SAW MACHINE AND METHOD

[75] Inventor: Charles W. Harnden, Ft. Lauderdale, Fla.

[73] Assignee: Alpine Engineered Products, Inc., Pompano Beach, Fla.

[21] Appl. No.: 129,781

[22] Filed: Sep. 27, 1993

Related U.S. Application Data

[63] Continuation of Ser. No. 898,151, Jun. 15, 1992, abandoned.

[51] Int. Cl.⁵ .................................................. B27B 5/20
[52] U.S. Cl. ........................................... 83/34; 83/36;
  83/76.1; 83/471.3; 83/486.1; 83/487;
  364/474.09; 364/474.25; 364/474.27
[58] Field of Search ................ 83/34, 35, 36, 72, 76.1,
  83/471.3, 487, 486.1; 364/474.09, 474.25,
  474.27

[56] References Cited

U.S. PATENT DOCUMENTS

| | | | |
|---|---|---|---|
| 354,170 | 12/1886 | Myers | 83/36 X |
| 2,007,563 | 7/1935 | De Koning | 83/486.1 |
| 2,382,971 | 8/1945 | Brocco et al. | 83/486.1 X |
| 2,664,926 | 1/1954 | Fuglie | 143/47 |
| 3,141,367 | 7/1964 | Keener et al. | 83/268 X |
| 3,627,866 | 12/1971 | Laws | 83/36 X |
| 3,910,142 | 10/1975 | Jureit et al. | 83/471.3 X |
| 4,392,176 | 7/1983 | Kneip et al. | 361/160 |
| 4,574,670 | 3/1986 | Johnson | 83/471.3 X |
| 4,641,557 | 2/1987 | Steiner et al. | 83/71 |
| 4,887,219 | 12/1989 | Strauser | 364/474.09 |
| 4,907,337 | 3/1990 | Krüsi | 83/471.3 X |
| 4,962,685 | 10/1990 | Hagstrom | 83/397 |
| 5,033,347 | 7/1991 | Hillistad et al. | 83/487 |
| 5,043,907 | 8/1991 | Richards | 364/474.09 |
| 5,176,060 | 1/1993 | Thornton | 83/471.3 X |
| 5,251,142 | 10/1993 | Cramer | 364/474.09 X |
| 5,265,510 | 11/1993 | Hoyer-Ellefsen | 83/486.1 X |

*Primary Examiner*—Richard K. Seidel
*Assistant Examiner*—Kenneth E. Peterson
*Attorney, Agent, or Firm*—Oltman and Flynn

[57] ABSTRACT

A saw apparatus for automatically sawing pieces of material at various predetermined lengths and angles includes a power saw mechanism, a rotatable saw mechanism mounting structure, a motor for rotating the mounting structure, a translational power saw moving mechanism, powered anchoring mechanisms for anchoring the pieces of material during sawing, a mechanism for longitudinally positioning the pieces of material relative to the power saw mechanism for cutting at desired lengths, a power supply and power supply connecting mechanism for delivering power to the mechanism for longitudinally positioning the pieces, to the powered anchoring mechanism, to the power saw mechanism, to the motor for rotating the mounting structure, and to the translational power saw moving mechanism, switches for controlling the flow of power through the connecting mechanism, a computer and program for the computer for operating the switches so that at least one piece of material is longitudinally positioned by the mechanism for longitudinally positioning the pieces, is automatically anchored by the powered anchoring mechanism, and the power saw mechanism is automatically rotated to a predetermined angle relative to the piece by the motor rotating the mounting structure, and the power saw mechanism is automatically moved to cut the piece by the translational power saw moving mechanism. The apparatus includes a table for supporting the pieces of material during sawing and a stop wall on the table against which the pieces of material are clamped.

4 Claims, 10 Drawing Sheets

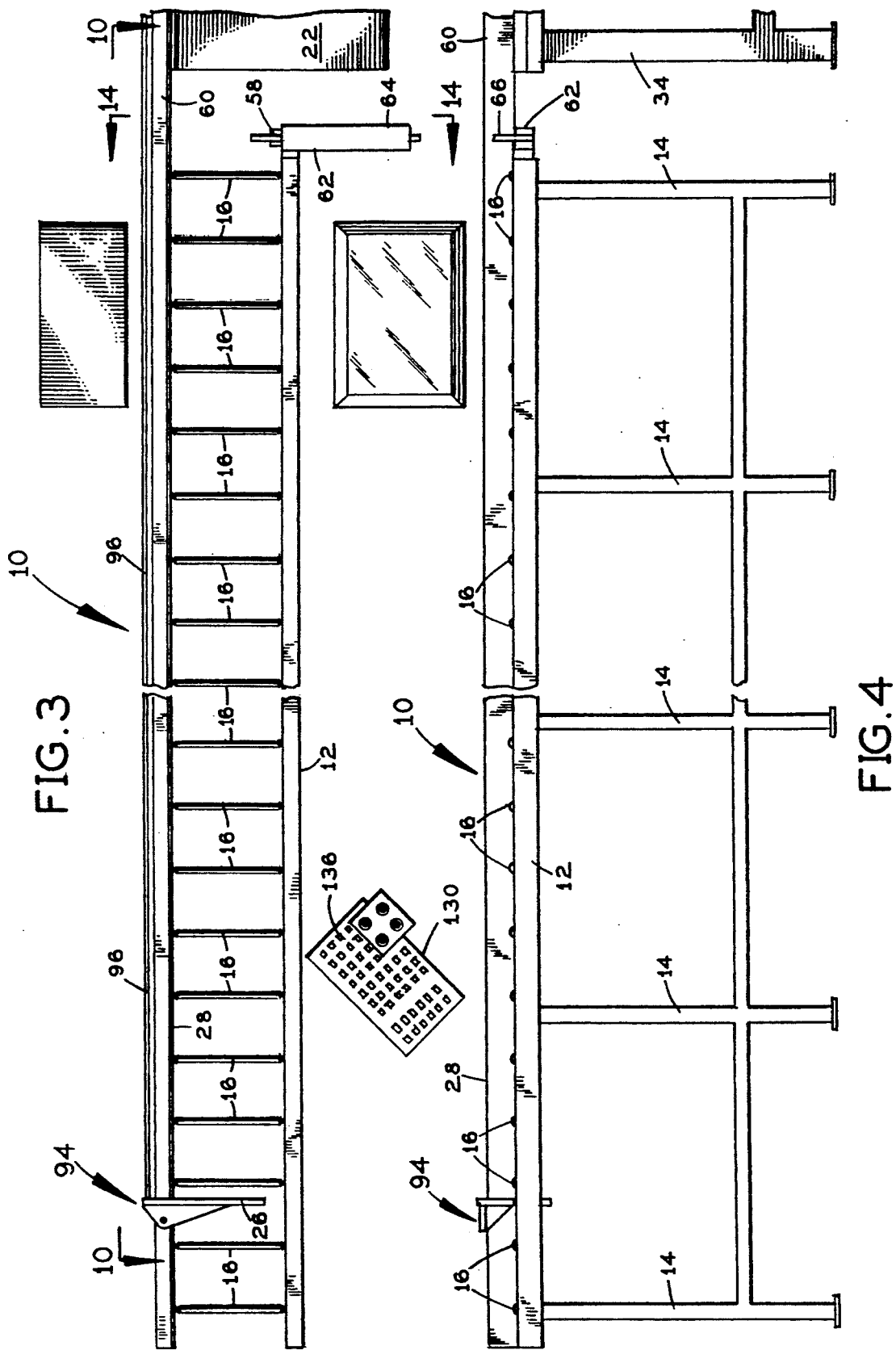

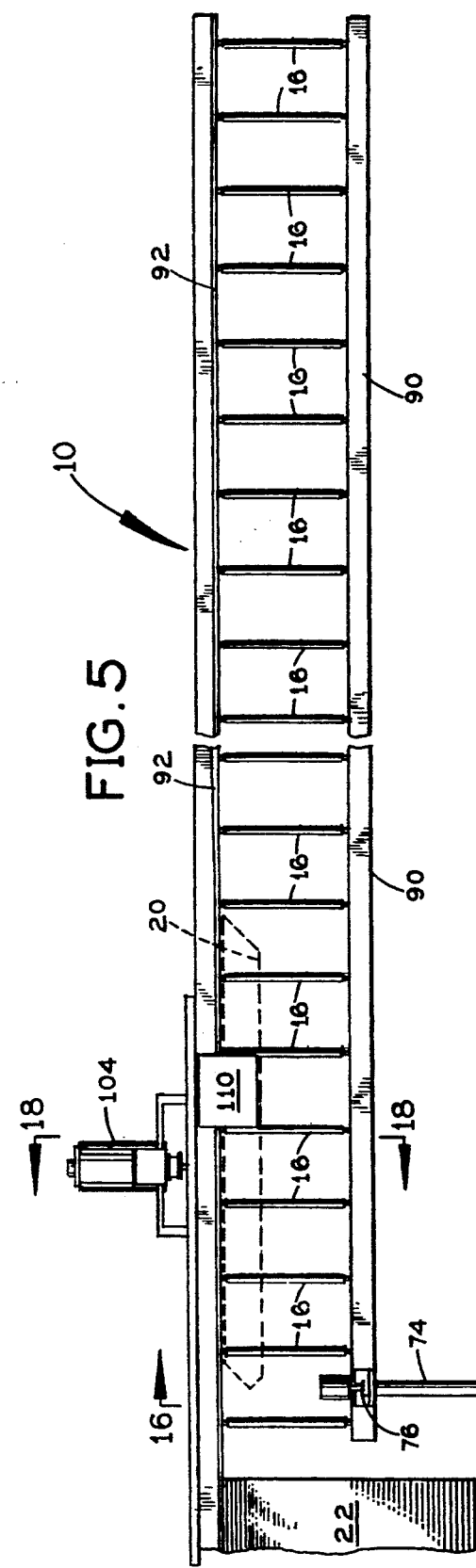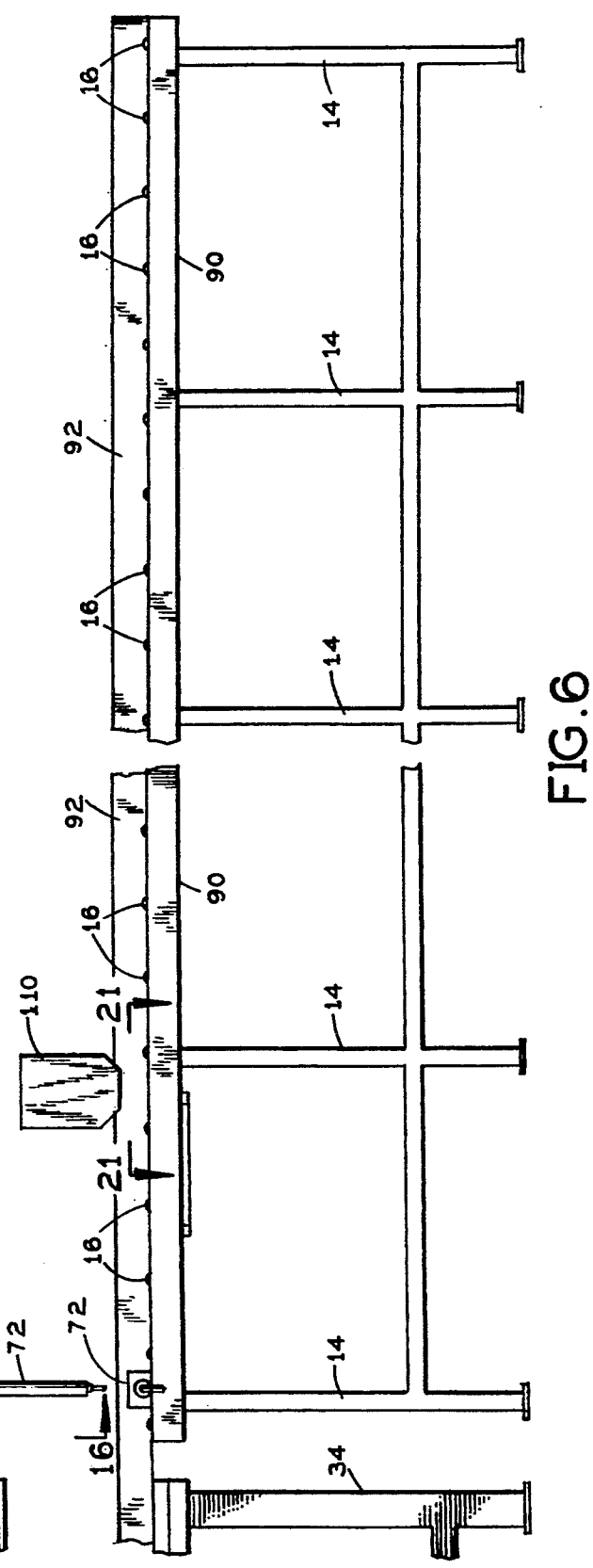

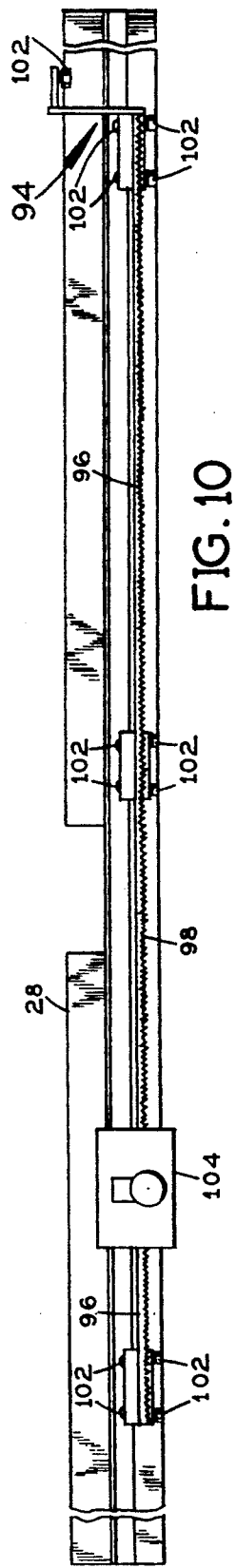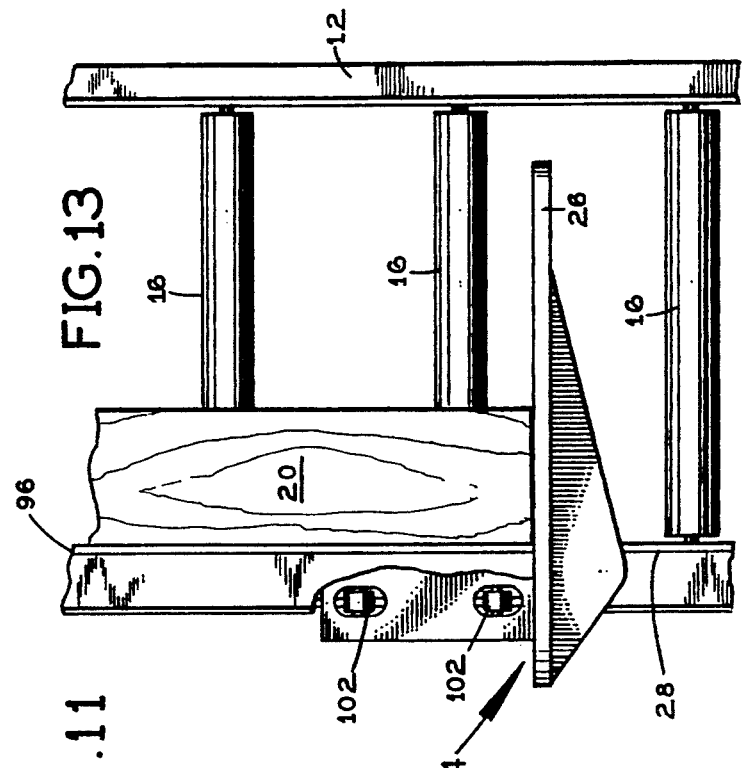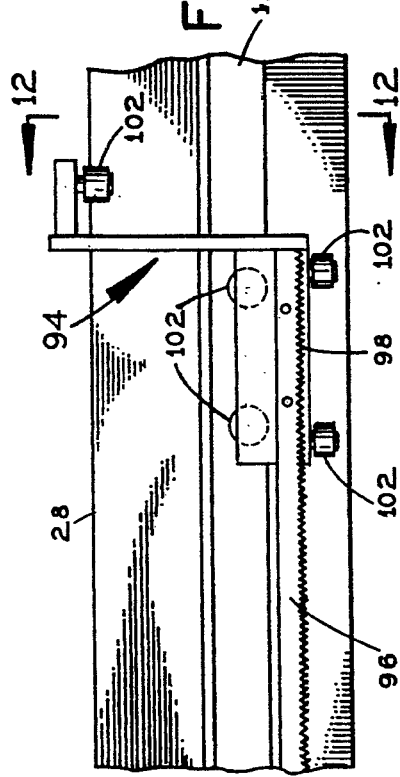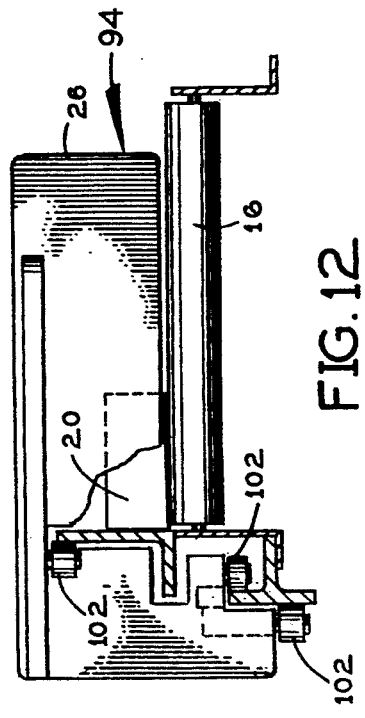

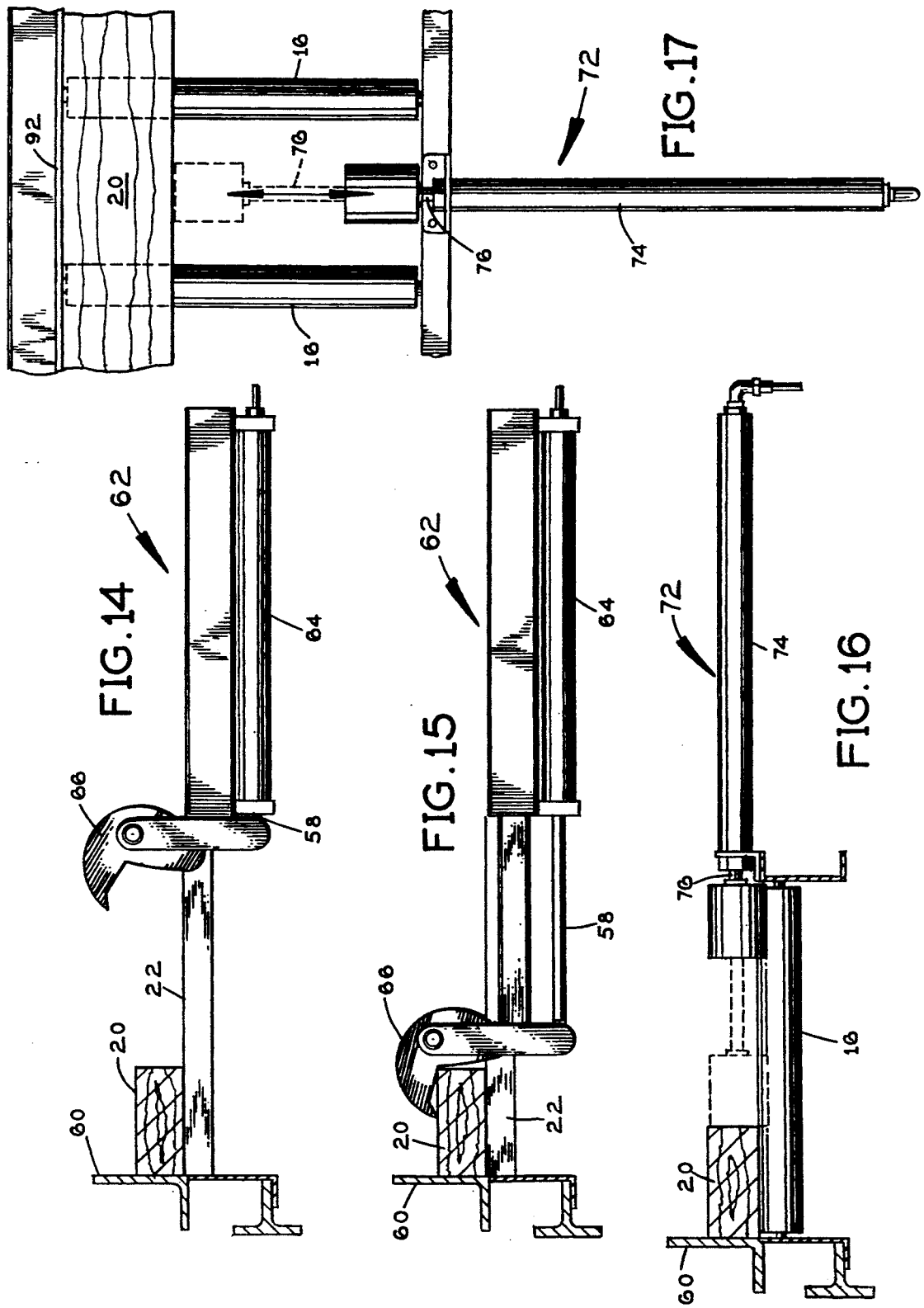

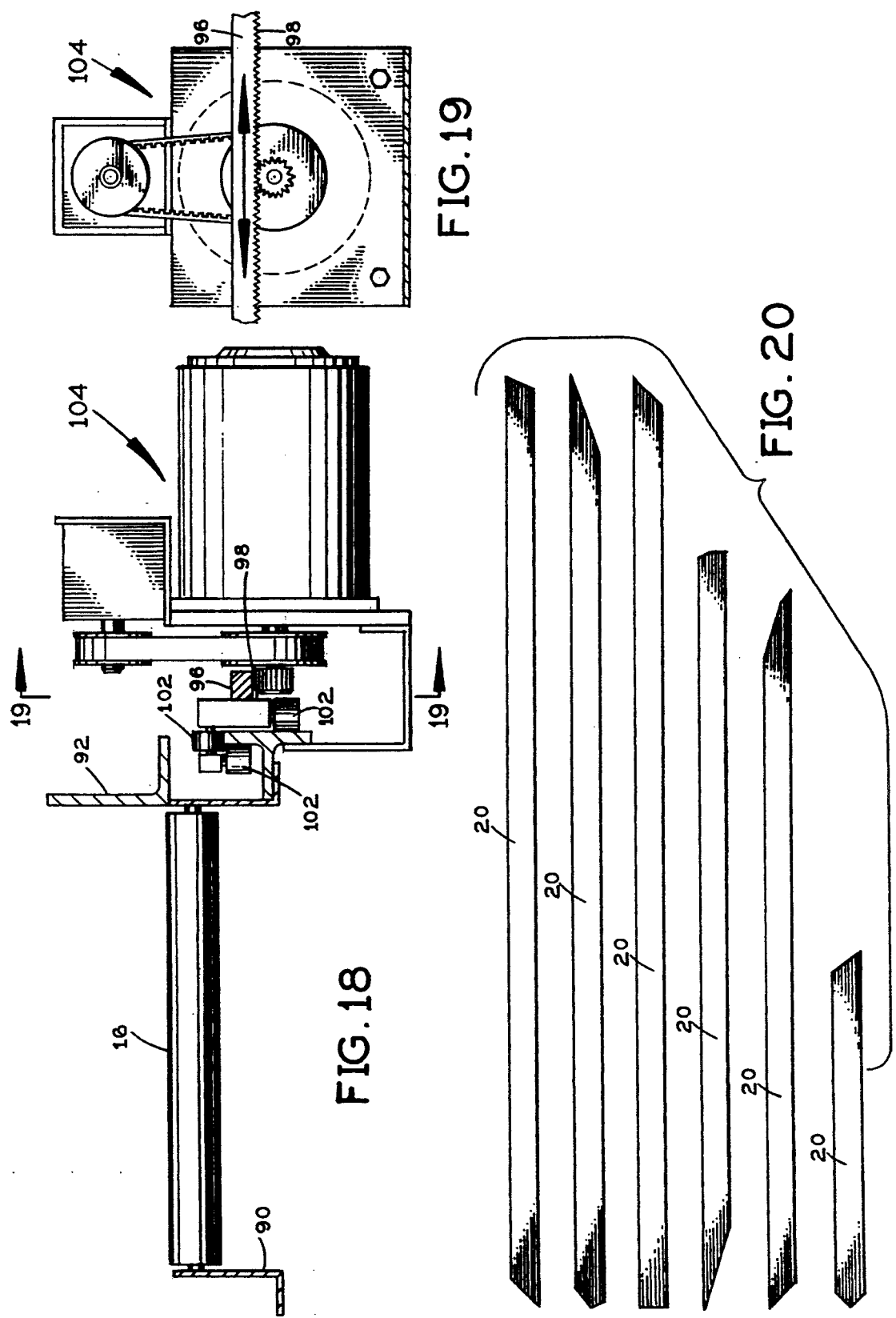

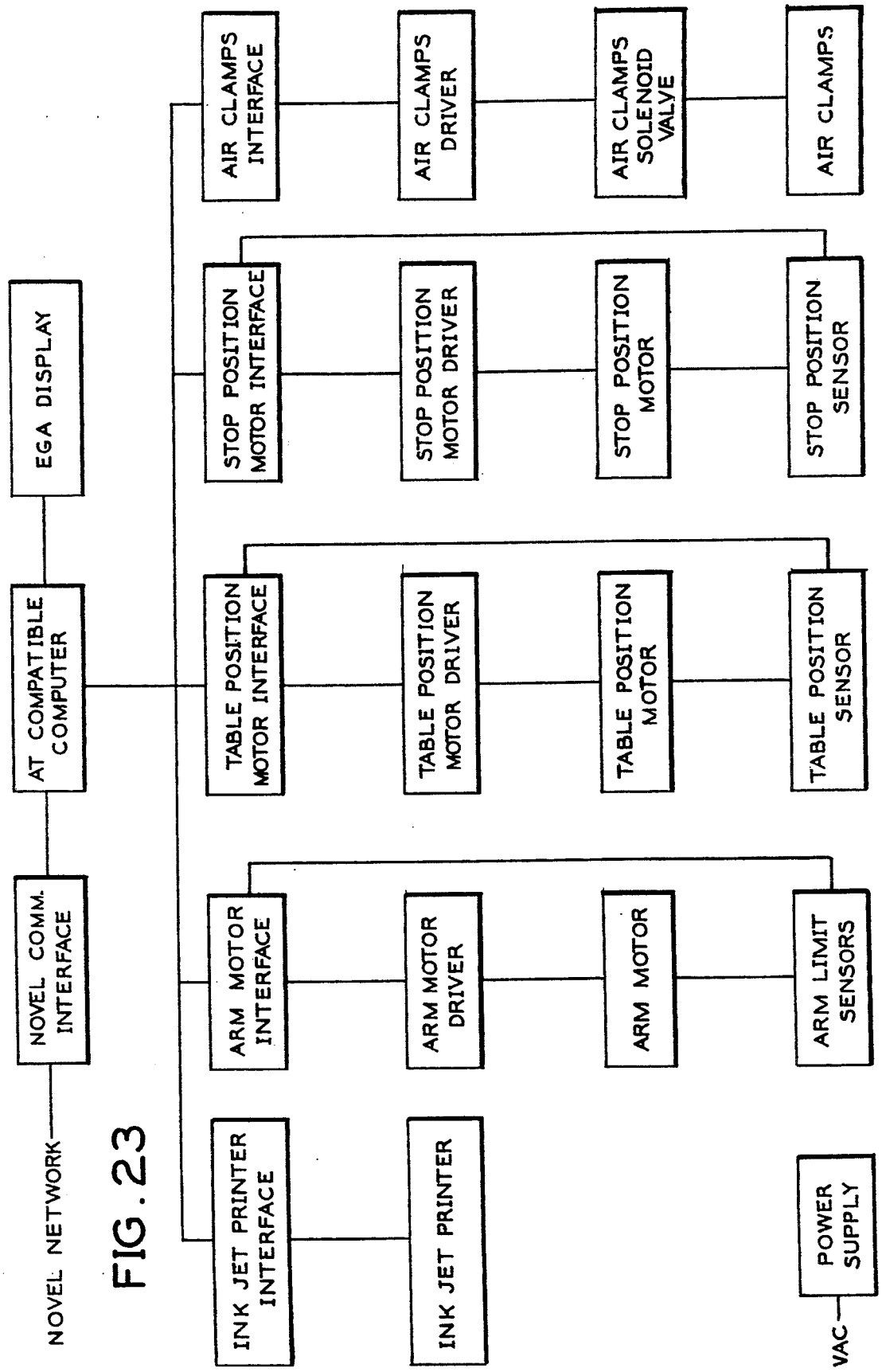

AUTOMATIC SAW MACHINE AND METHOD

This application is a continuation of application Ser. No. 07/898,151, filed Jun. 15, 1992, now abandoned.

BACKGROUND OF THE INVENTION

1. Field of the Invention

The present invention relates generally to the field of table saws, and more specifically to a computer-controlled table saw and method, including a conveyer track having support rollers for delivering pieces of lumber or other material to a table, an arm member extending over the track for positioning the pieces to be cut at a desired length, two pneumatic clamping elements which drive and hold each piece against a stop wall at the rear of the table, a circular saw mounting structure including a saw supporting arm member movable horizontally over the table with a hydraulic cylinder, motor and gear means underneath and supporting the saw mounting structure for rotating the saw mounting structure to orient the saw for each cut, an ink jet printer device for marking the pieces after they are cut and a track exit segment, a safety mat in front of the table for retracting the saw when a person stands on the mat, and a control panel tied into a computer having a program which controls the operation of the arm, the pneumatic clamping elements, saw, a motor for rotating the saw support structure, and a motor for moving the stop gage to the proper cutting length, so that a series of pieces placed on the track are automatically delivered to the table, cut at predetermined length and angles, labeled, and carried to a collection point.

2. Description of the Prior Art

There have long been automatic saws for reducing the manpower required to process lumber. While these saws have generally served their intended purposes, they have not been designed to be computer controlled to automatically make a variety of differently oriented cuts on the same work piece.

An example of these prior automatic saws is that of Fuglie, U.S. Pat. No. 2,664,926, issued on Jan. 5, 1954. Fuglie discloses an automatic saw mill for sawing logs and heavy timbers into boards. The logs are mounted between two chucks and cut by two separate sets of parallel saw blades mounted on a movable saw carriage. After sawing, the cut boards are automatically dropped onto a conveyor belt located below the saw blades. A problem with Fuglie is that there is no provision for making angled cuts across boards, as may be needed to construct trusses. And even if the logs could be somehow rotated to permit angled cuts, the angle could not change automatically for cuts at different angles on the same board. Another problem with Fuglie is that the person operating the saw apparatus must move dangerously close to the saw to load the timbers.

Strauser, U.S. Pat. No. 4,887,219, issued on Dec. 12, 1989, teaches a manual board cut-off saw assembly for enabling a cut-off saw operator to cross-cut several elongated boards at desired locations along their length. Strauser further permits the removal of defective sections from the boards based upon the observation of the operator. The apparatus includes several cut-off saw lines with manually activated cut-off saws for cutting the boards across each line. Each cut-off saw line has an optical measuring system and a sorter for sorting wood pieces according to their measured length, and for delivering information concerning board and wood piece lengths to a computer for storage. The computer also displays the recovery rate and production information. A problem with Strauser is that no provision is made for cutting the boards at the varying angles necessary for such applications as truss construction. Another problem with Strauser is that an operator can get dangerously close to the saw blades while they are spinning.

Hagstrom, U.S. Pat. No. 4,962,685, issued on Oct. 16, 1990, discloses a production table saw including a saw table and a storage cabinet below the saw table in which the saw is enclosed when not operating. A foot-activated pedal is provided to lift the saw blade out of the cabinet to an operating position. At the same time the pedal action causes a safety guard to move into a protective position over the blade. A problem with Hagstrom is that no provision is made for automatically making a series of varying angled saw cuts, nor for automatically measuring the cutting length of wood pieces on the saw. Thus Hagstrom is costly in man-hours to use. Another problem is that Hagstrom does not provide a large table surface or delivery means capable of handling long work pieces.

Richards, U.S. Pat. No. 5,043,907, issued on Aug. 27, 1991, illustrates a band saw apparatus and method regulated by a controller. A band saw is provided having a controller responsive to sensing signals as to operating parameters of the saw to generate a material distribution profile during a first cut of a piece of bar stock. During subsequent cuts, the controller operates control circuits for blade cutting force, blade feed rate, and blade speed to maintain a constant material cutting rate despite changes in material cross-section. A problem with Richards is that, once again, no provision is made for automatically making a series of varying angled saw cuts. Furthermore, no safety provision is apparently made for shutting off power to the saw when the operator is close to it.

Steiner, U.S. Pat. No. 4,641,557, issued on Feb. 10, 1987, teaches an electronically controlled power saw for making a number of different types of cuts on a work piece. A microcomputer is provided into which certain cut parameters are preset, such as saw elevation relative to the work piece. Yet for angled cuts, the arm on which the saw is mounted is swung into position manually for each cut. The microcomputer simply measures and displays the miter or bevel angle to aid in manually positioning the saw. A problem with Steiner is that angled cuts cannot be preprogrammed, but must be manually set up, one at a time. Steiner is thus relatively time-consuming to operate, and no continuous work piece feed is provided. Another problem, once again, is that the operator can move dangerously close to the saw while it is activated.

It is thus an object of the present invention to provide an automatic table saw apparatus which reduces labor costs with substantial computer control and operation.

It is another object of the present invention to provide such an apparatus which increases the accuracy of individual cuts and thereby reduces the number of re-cuts required, and eliminates undetected mis-cuts.

It is still another object of the present invention to provide such an apparatus which reduces set up time for a random mix of cuts and automatically schedules and tracks the pieces cut, to reduce inventory time.

It is finally an object of the present invention to provide such an apparatus which reduces the danger involved for the operator by permitting full operation several feet away from the saw table and automatically retracting the saw away from the operator when the operator moves too close to the saw table.

SUMMARY OF THE INVENTION

The present invention accomplishes the above-stated objectives, as well as others, as may be determined by a fair reading and interpretation of the entire specification.

A saw apparatus is provided for automatically sawing pieces of material at various predetermined lengths and angles, including a power saw mechanism, a rotatable saw mechanism mounting structure, a motor for rotating the mounting structure, a translational power saw moving mechanism, powered anchoring mechanisms for anchoring the pieces of material during sawing, a mechanism for longitudinally positioning the pieces of material relative to the power saw mechanism for cutting at desired lengths, a power supply and power supply connecting mechanism for delivering power to the mechanism for longitudinally positioning the pieces, to the powered anchoring mechanism, to the power saw mechanism, to the motor for rotating the mounting structure, and to the translational power saw moving mechanism, switches for controlling the flow of power through the connecting mechanism, a computer and program for the computer for operating the switches so that at least one piece of material is longitudinally positioned by the mechanism for longitudinally positioning the pieces, is automatically anchored by the powered anchoring mechanism, and the power saw mechanism is automatically rotated to a predetermined angle relative to the piece by the motor rotating the mounting structure, and the power saw mechanism is automatically moved to cut the piece by the translational power saw moving mechanism. The apparatus preferably includes a table for supporting the pieces of material during sawing and a stop wall on the table against which the pieces of material are clamped. The anchoring mechanism preferably includes clamp members mounted on a shaft of a piston contained within a pneumatic cylinder, for advancing against and clamping a piece of material against the stop wall. The mechanism for longitudinally positioning the pieces of material preferably includes a track on which the pieces of material are placed, a movable arm member extending over the track against which an end of each piece of material is placed, for longitudinally positioning the length of the pieces of material along the track relative to the power saw so that the piece of material is cut to a desired length. The arm member preferably includes a rack having an edge and having gear teeth along the edge, the edge being parallel to the track, a motor and a drive gear mounted on the motor for engaging the edge, and for moving the rack and thus moving the arm member along the track to a measuring position. A mat is also preferably provided beside the saw mechanism mounting structure, and a switch within the mat is activated by a person standing on the mat, for interrupting the flow of power through the connecting mechanism so that the translational power saw moving mechanism retracts the power saw mechanism away from the mat. The anchoring mechanism may alternatively be rotated instead of the saw mounting structure.

A method is also provided for automatically sawing pieces of material at various predetermined lengths and angles using a computer controlled saw apparatus having a piece delivery track, a saw blade, a saw table, a saw arm member for extending the saw blade over the saw table and cutting the pieces, clamps and a movable piece positioning arm member extending over the delivery track and a side rail for positioning the pieces along the delivery track, and a program for the computer, including the steps of logging onto the computer, signaling the computer through the program to move the saw arm member along the delivery track to a distance from the saw blade equivalent to the predetermined length, signaling the computer through the program to rotate the saw blade relative to the side rail to the predetermined angle, placing the piece on the delivery track, against the side rail with an end of the piece abutting the movable arm member, activating the saw arm member to advance the saw blade toward and cut the piece. The method may additionally include the steps of laterally or longitudinally flipping over the piece, signaling the computer through the program to rotate the saw blade relative to the side rail to a second predetermined angle, activating the saw arm member to advance the saw blade toward and cut the piece.

BRIEF DESCRIPTION OF THE DRAWINGS

Various other objects, advantages, and features of the invention will become apparent to those skilled in the art from the following discussion taken in conjunction with the following drawings, in which:

FIG. 3 is a top view of the intake track segment, arm, rack and first clamping assembly.

FIG. 4 is a front view of FIG. 3, showing the support frame under the intake track segment.

FIG. 5 is a top view of the output track segment, printer, motor and gear assembly for the rack, and second clamping assembly.

FIG. 6 is a front view of FIG. 5.

FIG. 10 is a side view of the rack, the arm carriage and a rail of a track segment, showing the mounting wheels on which the carriage and rack ride.

FIG. 11 is a close-up side view of the arm carriage on a track segment rail.

FIG. 12 is a cross-sectional view of a track segment and the arm carriage.

FIG. 13 is a top view of the arm member and carriage on a track segment.

FIG. 14 is a side view of the first clamping assembly and disk clamping element in the retracted position.

FIG. 15 is a side view as in FIG. 14, but with the clamping assembly in the extended position.

FIG. 16 is a side view of the second clamping assembly in the retracted position, and again in broken lines in the extended position.

FIG. 17 is a top view of FIG. 16.

FIG. 18 is a close-up side view of the motor and gear assembly for moving the rack and cross-sectional view of the output track segment.

FIG. 19 is a front view of the rack motor and gear assembly and a segment of the rack engaged by the assembly.

FIG. 20 is a top view of several boards cut by the inventive apparatus at angles suitable for use in truss construction. Cutting such truss elements is a key intended purpose of the apparatus.

FIG. 23 is a conceptual block diagram illustrating the interaction of the computer with the rest of the apparatus.

DETAILED DESCRIPTION OF THE PREFERRED EMBODIMENTS

Figure 1:
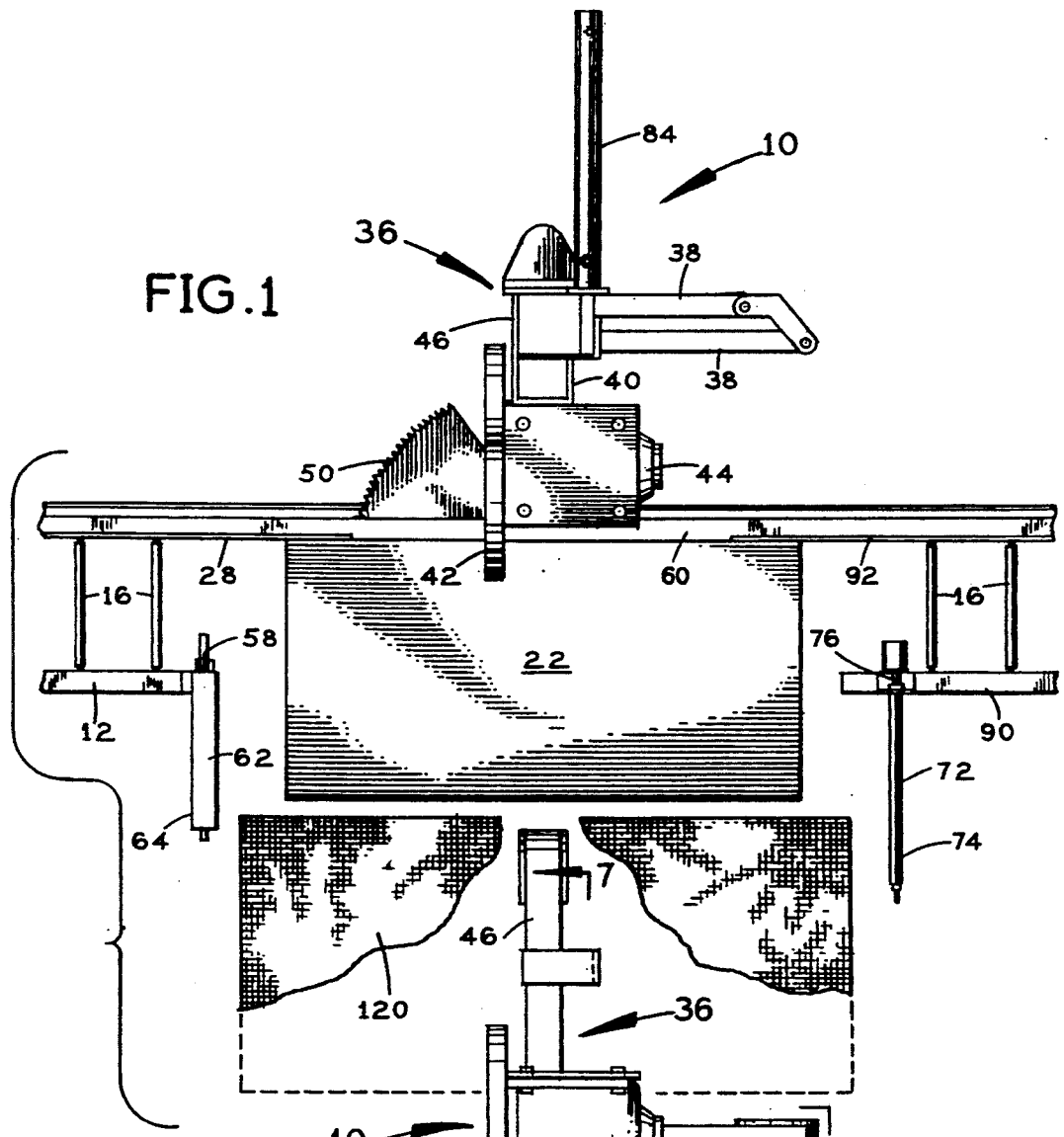
FIG. 1 is a top view of the saw table, saw, mounting structure and clamps of the inventive apparatus.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
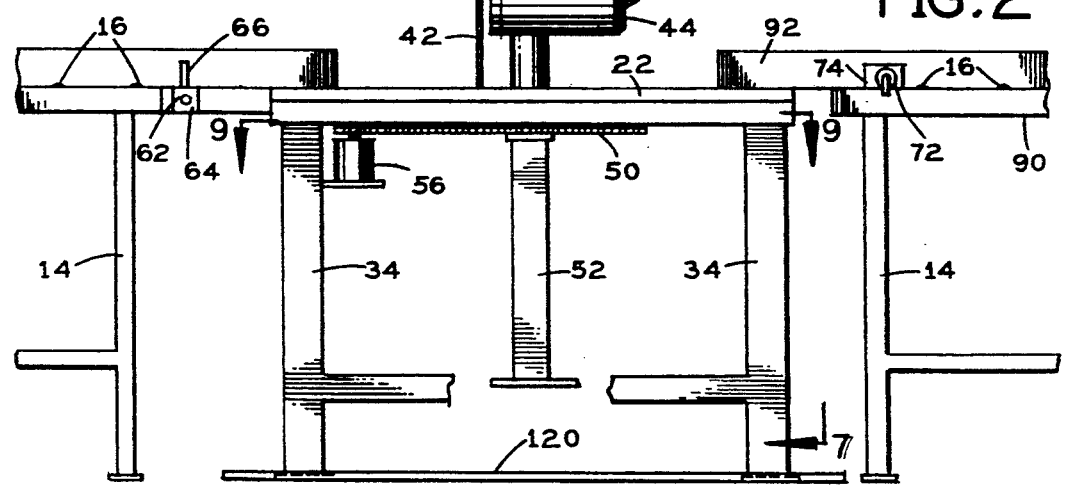
FIG. 2 is a front view of FIG. 1.
Figure 7:
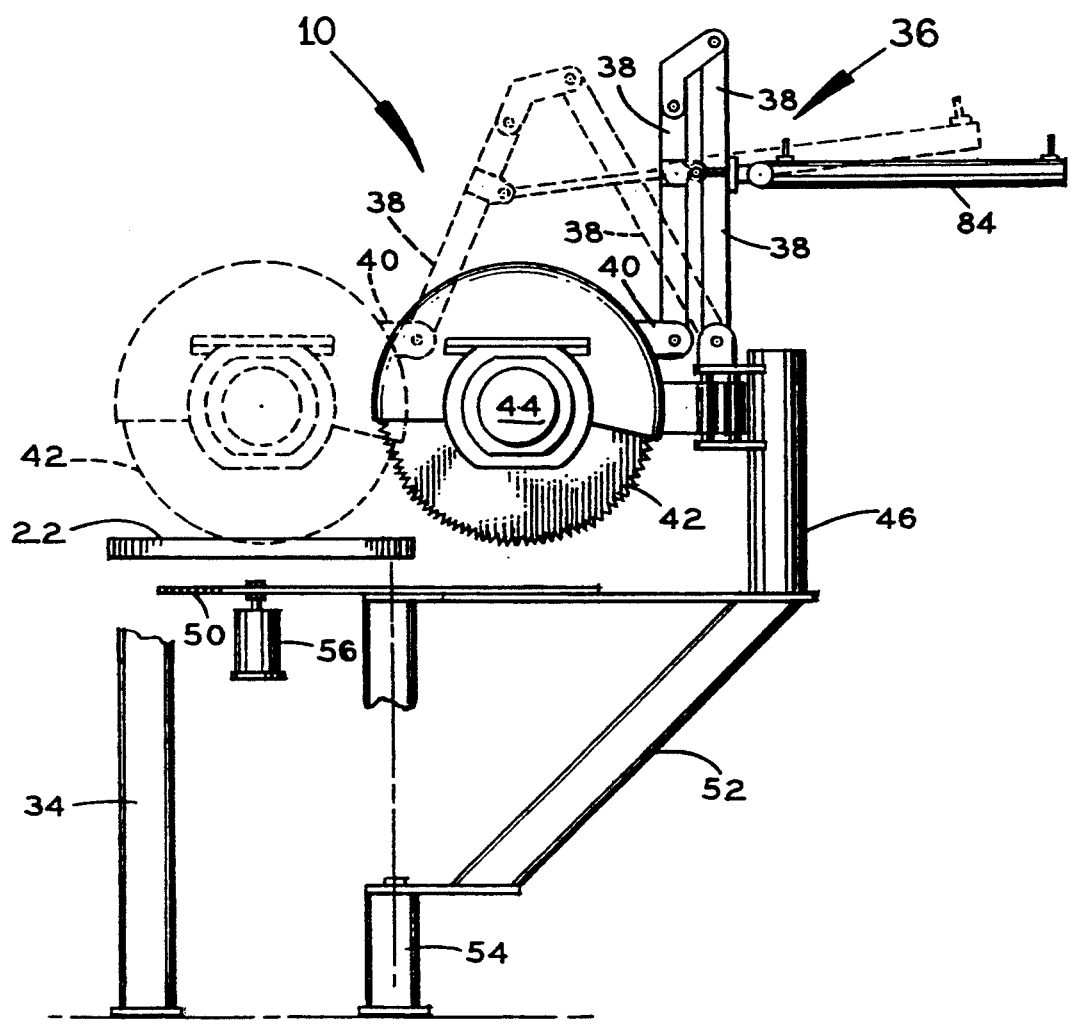
FIG. 7 is a side view of the saw, table, and mounting structure showing the saw and linkages in a retracted horizontal position, and in an extended position in broken lines.
Figure 8:
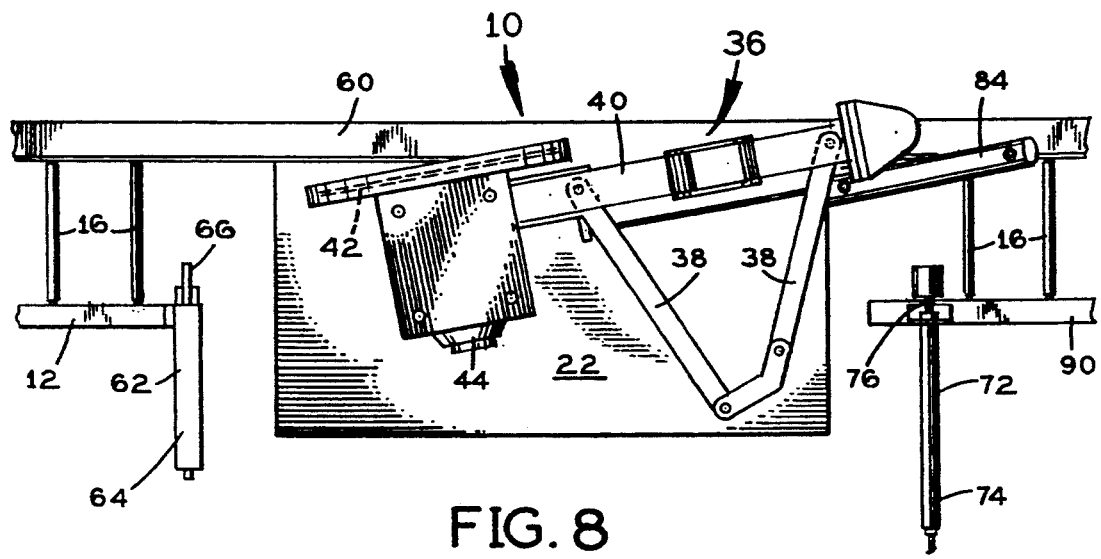
FIG. 8 is a top view of the saw, table, mounting structure and clamping assemblies.
Figure 9:
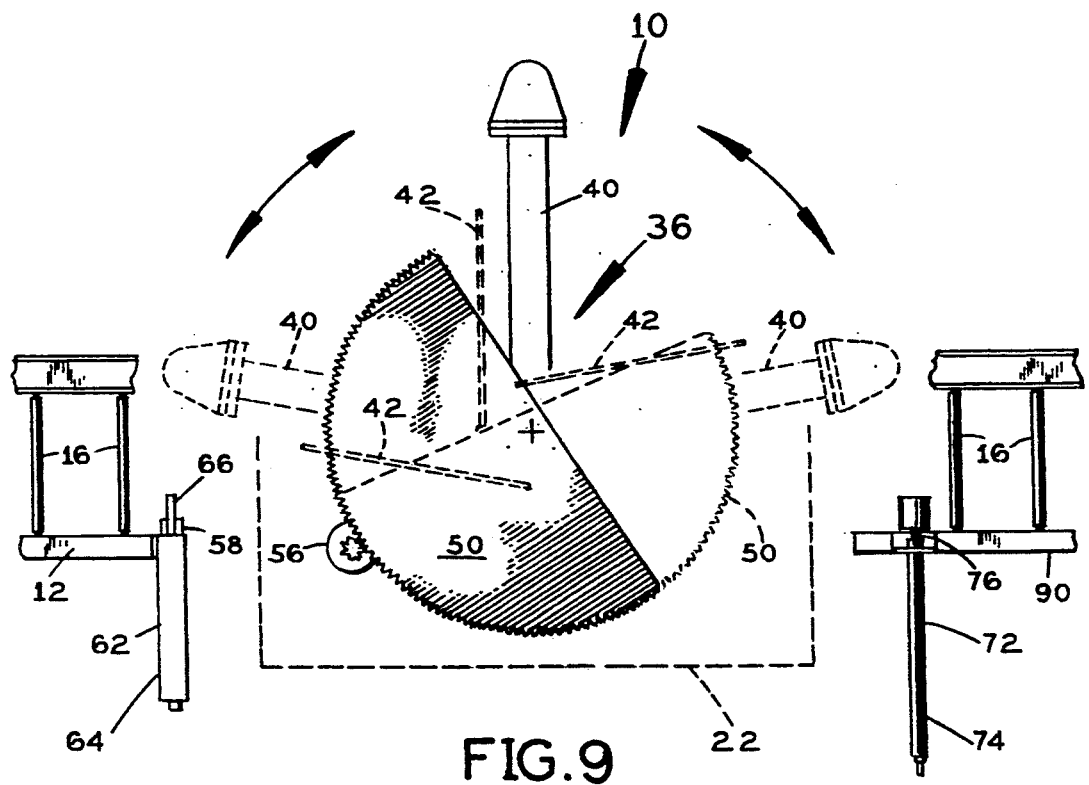
FIG. 9 is a top view as in FIG. 8, except that the table is shown in broken lines and the gears and motor for rotating the mounting assembly are revealed beneath the table. The mounting assembly is shown in a rotational position to make right angle saw cuts, and twice again in broken lines to make angled saw cuts.
Figure 21:
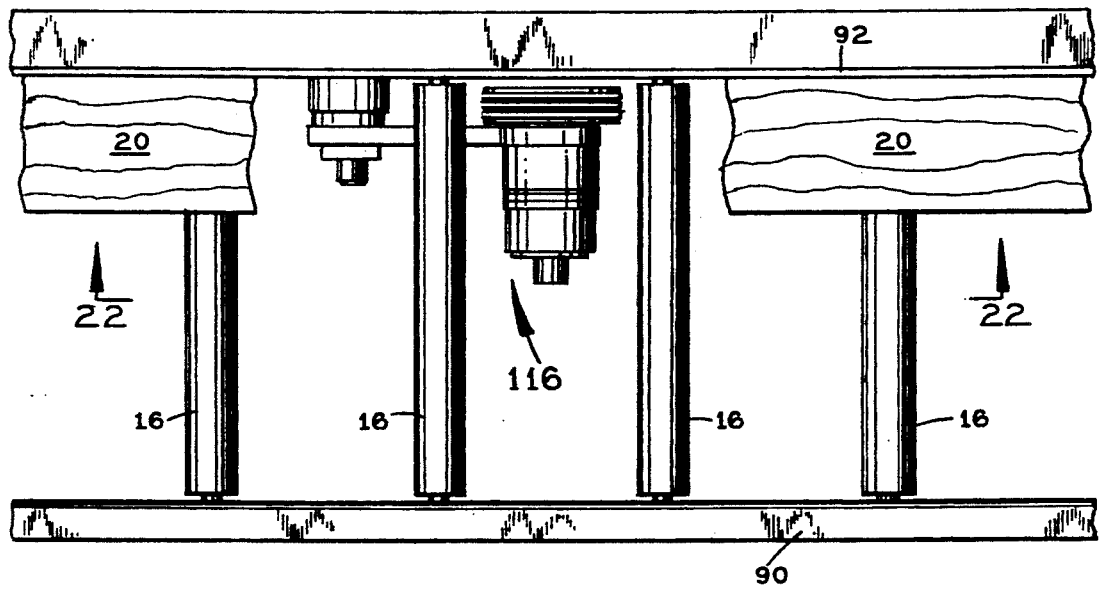
FIG. 21 is a close-up top view of the speed encoder located below the output track segment, with the printer assembly removed.
Figure 22:
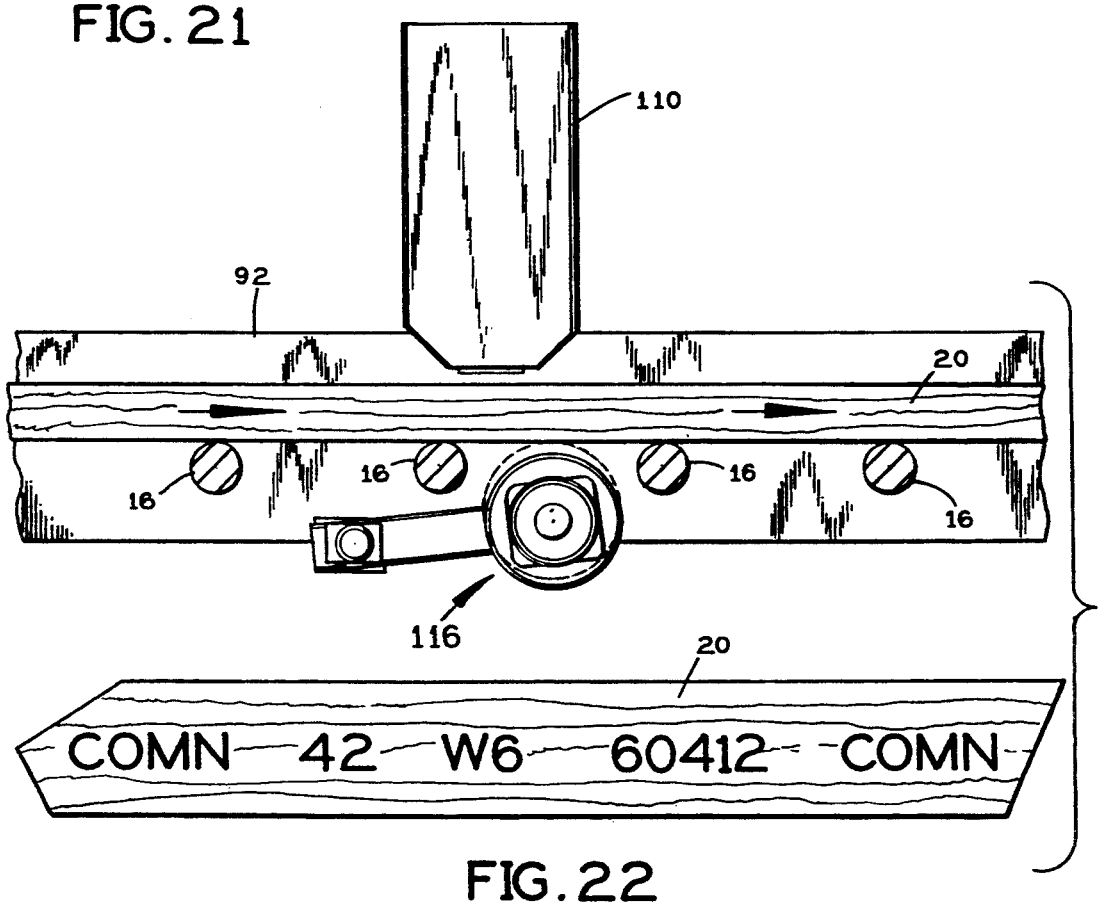
FIG. 22 is a side view of the speed encoder of FIG. 21 and the printer assembly as well, and a printed work piece.

Referring to FIGS. 1-23, a computer-operated sawing apparatus 10 is disclosed for automatically measuring pieces of lumber or other material, clamping the pieces, rotating a saw mounting structure to make cuts at various predetermined angles, and delivering the pieces from the table to a discharge location.

Apparatus 10 includes an elongate intake track segment 12 mounted on a support frame 14 having a series of support rollers 16 for delivering the pieces 20 of material to the table 22, an arm member 26 mounted to a side rail 28 of track segment 12 for pushing pieces 20 along track segment 12 to table 22. See FIGS. 1-7. Table 22 is a plywood sheet placed on top of supporting frame members 34. The saw mounting structure 36 includes several pivoting linkages 38 and a telescoping horizontal arm 40 extending over table 22 on which a circular saw 42 and a saw motor 44 are attached. See FIGS. 7, 8 and 9. Horizontal arm 40 is connected to a vertical arm segment 46. Vertical arm segment 46 attaches to an edge of a mounting structure positioning gear 50, and has an angled lower segment 52 extending at about a 45 degree angle downward and under table 22 to pivotally join to a fixed, central mounting shaft 54. Gear 50 is driven by a motor and gear assembly 56 for rotating structure 36.

A stop wall 60 is provided on table 22 against which pieces 20 are clamped during sawing. See FIG. 1. A first clamping assembly 62 includes a piston rod 58 extending from an air-driven pneumatic cylinder 64. See FIGS. 14 and 15. Assembly 62 is positioned adjacent and perpendicular to track segment 12 for clamping each piece 20 against stop wall 60. A rotatable disk clamping element 66, having a section cut out essentially along two radial lines and a tooth 68 on one radial edge, is rotatably mounted on rod 58 to grip side and top faces of piece 20. A second clamping assembly 72 is provided parallel to assembly 62 and includes a second air driven pneumatic cylinder 74 and piston rod 76, and operates in unison with assembly 62 to clamp each piece 20. See FIGS. 16 and 17. Clamping assemblies 62 and 72 are operated by a single air solenoid valve which forces air into the cylinders to push pistons to cause piston rods 58 and 76 to extend or withdraw as needed. The air solenoid valve is controlled by the computer. A hydraulic cylinder 84 is provided, and is attached to arm 40 for extending and retracting saw 42 along its horizontal path. See FIGS. 7,8 and 9. A track segment 90 continues on the opposite side of table 22 from track 12 segment and either includes rollers 16 or a conveyor belt, and a guide rail 92 along which a second arm member 26 moves to position pieces 20 when flipped end over end. The rollers 16 or conveyor belt deliver each piece 20 to a collection point, where pieces 20 are removed from apparatus 10.

Each arm member 26 is attached to an arm carriage 94, which includes a rack member 96. See FIGS. 10-13. Each rack member 96 has an edge 98 with gear teeth directed downward and engaged by a motor and gear assembly 104, and rides adjacent and parallel to guide rails 28 and 92. Wheels 102 extend from arm carriage 94 to ride against guide rails 28 and 92 to minimize friction.

A printer assembly 110 is preferably provided adjacent to output track segment 90 for marking pieces 20 with information about the same cuts made on it. See FIGS. 21 and 22. Assembly 110 may also place the name of the manufacturer or any other information on pieces 20. A speed encoder 116 of conventional design is provided below the printer head. See FIG. 21. Assembly 110 is of a type well known in the industry, and a CRS ink jet printer subsystem is preferred. An encoder wheel mounted on the drive roller 16 system feeds back information to printer assembly 110 regarding the speed of travel of pieces 20. The printer controller senses the leading edge of the advancing piece 20 and sprays printed characters onto piece 20 as it travels under the print head. The printer controller communicates with the computer to obtain print information and to report the status of the printing.

A safety mat 120 is preferably provided in front of table 22 and contains a sensor and switch for causing hydraulic cylinder 84 to retract arm 40 away from mat 120 when a person stands on mat 120. See FIG. 1.

A control panel 130 (See FIG. 3) is tied into a computer having a program which controls the movement of arm member 26, the flow of air into and out of pneumatic cylinders 54 and 64 to operate clamping elements 52 and 62, saw motor 44 and motor 56 for rotating saw mounting structure 36. See FIG. 23 for a conceptual block diagram. As a result of this computer control, a series of pieces 20 placed on track segment 12 are automatically delivered to table 22, cut at predetermined angles, labeled, and carried on track segment 90 to a collection point. It is alternatively contemplated that table 22 rotate, rather than saw mounting structure 36.

Method

In practicing the invention, the following method may be used. The operator turns on the computer, which is equipped with data input means such as a conventional keyboard 136. The computer automatically boots up the program and displays the truss-calculation selection display such as main menu on the screen. The main menu includes option numbers 1 and 2. With Option No. 1, the operator can load cutting files from a floppy disk to the hard disk in the computer. With option number 2, the operator can turn on the apparatus 10 truss options menu. Using the arrow keys, the operator moves the highlighted bar down to "HOME" and presses the Enter key. The saw blade 42 then automatically positions itself. The operator next selects the truss to be cut. Again using the arrow keys, the operator moves the highlighted bar to either "CHORDS", "WEBS", or "TRUSS" for items to be cut and presses the Enter key. Next the operator moves the highlighted bar to "PICK TRUSS", and presses the Enter key. The trusses loaded into the computer appear on the screen. The operator uses the arrow keys to move the highlighted bar up or down to select the truss to be cut, then presses the Enter key. The computer clears the list of trusses from the screen and moves the highlighted bar to "LOAD PIECES". The operator places a piece 20 on track 12 and presses the Enter key. Saw blade 42 is automatically positioned at the necessary angle and arm member 26 is automatically positioned at a distance to give the necessary length for the piece 20 to be cut. A picture of the piece 20 to be cut appears on the screen, with the angle to be cut highlighted. After the operator has positioned piece 20, he must use both hands to press the two pairs of buttons to extend saw arm 40. One pair of buttons will extend saw arm 40 more rapidly and will work better on single piece 20 cutting. Another pair of buttons will extend saw arm 40 more slowly, such as when two pieces 20 are being cut at one time or when extra long single cuts are being made.

Upon completion of the cut, the operator simply reads the screen and the computer displays what the next operation will be. When there is only a single cut to be made on piece 20, the display will call for a new piece. If this is the case, the operator slides the cut piece 20 under and through printer assembly 110 to label the piece 20 and then presses the Enter key to position saw blade 42 for a new piece 20. If there is more than one angle to be cut on the same end of the piece 20, the program causes saw blade 42 to automatically move to the next desired angle and arm member 26 to the next desired length. When piece 20 has two long angles to cut on the same end, the screen tells the operator to roll piece 20 over, following the first cut. Piece 20 is rolled over so the angle just cut is directed away from side rail 28. Then the operator presses the Enter key to signal to the computer that piece 20 has been rolled over. The screen then shows piece 20 in the rolled over position, and saw blade 42 is positioned at the necessary angle and arm member 26 positioned at the necessary length to make the next cut. The next step is to cut piece 20. If piece 20 is to be cut on both ends, the screen instructs the operator to flip piece 20, if it is eight feet long or shorter, or to slide piece 20 to the right arm member 26, if it is over eight feet in length.

Where piece 20 is flipped, it is done end over end and pushed tight against the left arm member 26. As with rolling piece 20 over, the operator must press the Enter key to tell the computer that piece 20 has been flipped. Again, the screen shows piece 20 in the flipped position, and saw blade 42 and arm member 26 automatically adjust to the new angle and length, respectively. The operator presses the buttons to complete the cut on the second end and then pushes the piece 20 through printer assembly 110.

On the other hand, sliding the pieces 20 avoids the need to flip long pieces 20. When the sliding procedure is used, the second end is positioned using the right arm member 26. The operator pulls the right arm member 26 button to lower the right stop, and then presses the Enter key and apparatus 10 adjusts for the new angle and length. Then the operator slides piece 20 to the right side under the printer assembly 110 head tight to the right arm member 26 and side rail 28, and makes the cut. When finished, the operator pushes the right stop button to raise the stop and slide piece 20 down conveyor output track segment 90. The screen now shows "NEW PIECE". The operator then presses the Enter key to display the next piece 20. When all pieces 20 of a truss are cut, the screen becomes largely blank and "LOAD PIECES" is highlighted on the right side of the screen. The operator moves the highlighted bar to "PICK TRUSS" and executes the above steps once again.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A method of sawing lumber using a saw machine comprising a saw table with a pivoting saw blade mounted over said table on a telescoping arm which is rotatable relative to said table to various angles and activated to make a cut in a work piece with a switch, the table being within a work piece-carrying track having a movable stop member at one end, the angle of said arm over said table and the position of said stop member relative to said table being controlled by a computer having a program with a structure-to-be-cut options selection display and a display monitor with a screen and data input selection means having cursor moving means and an enter button, comprising the steps of:

operating said selection means to select the general type of structure-to-be-cut and pressing said enter button, thereby telling said computer to cause said specific variations of the selected general type of structure loaded into said computer to appear on said screen, operating said selection means to select one of said specific variation to be cut, then pressing said enter button, thereby telling said computer to clear the list of said specific variations from said screen, operating said selection means to make a program selection to communicate to said computer that the operator is loading a given work piece onto said track, loading said given work piece onto said track, pressing said enter button to tell said computer that said work piece is loaded onto said track, so that a graphic representation of said work piece appears on said screen oriented in its proper position to make the next cut for the user to visually confirm proper work piece orientation, and so that said computer causes said saw blade to automatically move to a position at the necessary angle and said stop member to automatically move to a position at a distance which gives the necessary length for said given work piece to be cut, operating said switch to activate said telescoping saw arm, waiting for said saw arm to complete a cut, reading said screen on which said computer displays what the next operation will be, waiting for said computer to cause said saw blade to automatically move to the next desired angle, operating said switch to again activate said telescoping saw arm, reading said display screen on which said computer indicates that a new work piece is to be loaded, removing said given work piece from said track, pressing said enter button to position said saw blade for said new work piece.

2. A method of sawing lumber using a saw machine comprising a saw table with a pivoting saw blade mounted over said table on a telescoping arm which is rotatable relative to said table to various angles and activated to make a cut with a switch, the table being within a work piece-carrying track having a movable stop member at one end and a side rail, the angle of said arm over said table and the position of said stop member relative to said table being controlled by a computer having a program with an apparatus structure-to-be-cut options selection display and a display monitor with a screen and data input selection means having cursor moving means and an enter button, comprising the steps of:

operating said selection means to select the general type of structure-to-be-cut and pressing said enter button, thereby telling said computer to cause said specific variations of the selected general type of structure loaded into said computer to appear on said screen, operating said selection means to select one of said specific variation to be cut, then pressing said enter button, thereby telling said computer to clear the list of said specific variations from said screen, operating said selection means to make a program selection to communicate to said computer that the operator is loading a given work piece onto said track, loading said given work piece onto said track, pressing said enter button to tell said computer that said work piece is loaded onto said track, so that a graphic representation of said work piece appears on said screen oriented in its proper position to make the next cut for the user to visually confirm proper work piece orientation, and so that said computer causes said saw blade to automatically move to a position at the necessary angle and said stop member to automatically move to a position at a distance which gives the necessary length for said given work piece to be cut, operating said switch to activate said telescoping saw arm, waiting for said saw arm to complete a cut, reading said screen on which said computer displays what the next operation will be, reading said screen which tells the operator to laterally roll said given work piece over, following the first cut, rolling said given work piece over so the angle just cut is directed away from said side rail, pressing said enter button to signal to said computer that said given work piece has been rolled over, so that a graphic representation of said work piece appears on said screen oriented in its proper rolled over position to make the next cut for the user to visually confirm proper work piece orientation, and so that said computer causes said saw blade to automatically move to a position at the necessary angle to make said next cut, waiting for said saw blade to be positioned by a motor and switches controlled by said computer at the necessary angle, and for said telescoping arm member to be positioned at the necessary length to make the next cut, operating said switch to activate said telescoping saw arm to again cut said given work piece, removing said given work piece from said track, pressing said enter button to position said saw blade for said new work piece.

3. A method of sawing lumber using a saw machine comprising a saw table with a pivoting saw blade mounted over said table on a telescoping arm which is rotatable relative to said table to various angles and activated to make a cut with a switch, the table being within a work piece-carrying track having a movable stop member at one end, the angle of said arm over said table and the position of said stop member relative to said table being controlled by a computer having a program with an apparatus structure-to-be-cut options selection display and a display monitor with a screen and data input selection means having cursor moving means and an enter button, comprising the steps of:

operating said selection means to select the general type of structure-to-be-cut and pressing said enter button, thereby telling said computer to cause said specific variations of the selected general type of structure loaded into said computer to appear on said screen, operating said selection means to select one of said specific variation to be cut, then pressing said enter button, thereby telling said computer to clear the list of said specific variations from said screen, operating said selection means to make a program selection to communicate to said computer that the operator is loading a given work piece onto said track, loading said given work piece onto said track, pressing said enter button to tell said computer that said work piece is loaded onto said track, so that a graphic representation of said work piece appears on said screen oriented in its proper position to make the next cut for the user to visually confirm proper work piece orientation, and so that said computer causes said saw blade to automatically move to a position at the necessary angle and said stop member to automatically move to a position at a distance which gives the necessary length for said given work piece to be cut, operating said switch to activate said telescoping saw arm, waiting for said saw arm to complete a cut, reading said screen on which said computer displays what the next operation will be, reading said screen which instructs the operator to flip said given work piece, pressing said enter button to tell said computer that said given work piece has been flipped, so that said computer causes said saw blade and said telescoping arm member to automatically adjust to the new angle and length, operating said switch to activate said telescoping saw arm, removing said given work piece from said track, pressing said enter button to position said saw blade for said new work piece.

4. A method of sawing lumber using a saw machine comprising a saw table with a pivoting saw blade mounted over said table on a telescoping arm which is rotatable relative to said table to various angles and activated to make a cut in a work piece with a switch, the table being within a work piece-carrying track having a movable stop member at one end and a second movable stop member at a second end, the angle of said arm over said table and the position of said stop member relative to said table being controlled by a computer having a program with an apparatus structure-to-be-cut options selection display and a display monitor with a screen and data input selection means having cursor moving means and an enter button, comprising the steps of:

operating said selection means to select the general type of structure-to-be-cut and pressing said enter button, thereby telling said computer to cause said specific variations of the selected general type of structure loaded into said computer to appear on said screen, operating said selection means to select one of said specific variation to be cut, then pressing said enter button, thereby telling said computer to clear the list of said specific variations from said screen, operating said selection means to make a program selection to communicate to said computer that the operator is loading a given work piece onto said track, loading said given work piece onto said track, pressing said enter button to tell said computer that said work piece is loaded onto said track, so that a graphic representation of said work piece appears on said screen oriented in its proper position to make the next cut for the user to visually confirm proper work piece orientation, and so that said computer causes said saw blade to automatically move to a position at the necessary angle and said stop member to automatically move to a position at a distance which gives the necessary length for said given work piece to be cut, operating said switch to activate said telescoping saw arm, waiting for said saw arm to complete a cut, reading said screen on which said computer displays what the next operation will be, waiting for said computer to cause said saw blade to automatically move to the next desired angle, operating said switch to again activate said telescoping saw arm, reading said display screen on which said computer indicates that a new work piece is to be loaded, pressing said enter button to tell said computer to adjust said saw position and stop position for a new angle and length at a second end of said given work piece, sliding said given work piece against said second stop member, operating said switch to activate said telescoping saw arm, removing said given work piece from said track, pressing said enter button to position said saw blade for said new work piece.

* * * * *